(12) United States Patent
Yamamoto et al.

(10) Patent No.: US 10,339,104 B2
(45) Date of Patent: Jul. 2, 2019

(54) INFORMATION PROCESSING APPARATUS, FILE MANAGEMENT METHOD, AND COMPUTER-READABLE RECORDING MEDIUM HAVING STORED THEREIN FILE MANAGEMENT PROGRAM

(71) Applicant: FUJITSU LIMITED, Kawasaki-shi, Kanagawa (JP)

(72) Inventors: Kohshi Yamamoto, Kawasaki (JP); Yasuhiro Suzuki, Yokohama (JP); Masahiro Kataoka, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 827 days.

(21) Appl. No.: 14/571,517

(22) Filed: Dec. 16, 2014

(65) Prior Publication Data

US 2015/0106409 A1 Apr. 16, 2015

Related U.S. Application Data

(63) Continuation of application No. PCT/JP2012/066142, filed on Jun. 25, 2012.

(51) Int. Cl.
*G06F 16/14* (2019.01)
*G06F 16/16* (2019.01)

(52) U.S. Cl.
CPC .......... *G06F 16/152* (2019.01); *G06F 16/162* (2019.01)

(58) Field of Classification Search
USPC ........................................................ 707/821
See application file for complete search history.

(56) References Cited

U.S. PATENT DOCUMENTS

| 5,926,821 | A | * | 7/1999 | Hirose | ................... G06F 3/0619 |
| 5,946,677 | A | * | 8/1999 | Bullen | .............. G06F 17/30067 707/700 |
| 2005/0102312 | A1 | * | 5/2005 | Ohya | ................... G06F 21/6245 |
| 2005/0210523 | A1 | * | 9/2005 | Parnell | ................... H04N 7/162 725/97 |
| 2006/0244639 | A1 | * | 11/2006 | Parker | .................... H03M 7/40 341/51 |

(Continued)

FOREIGN PATENT DOCUMENTS

| JP | 01-237723 | 9/1989 |
| JP | 2000-20545 | 1/2000 |

(Continued)

OTHER PUBLICATIONS

International Search Report, mailed in connection with PCT/JP2012/066142 and dated Sep. 4, 2012.

*Primary Examiner* — Cheyne D Ly
(74) *Attorney, Agent, or Firm* — Fujitsu Patent Center

(57) ABSTRACT

An information processing apparatus which manages a file which holds information including a plurality of items, includes a processor, the processor configured to: search for a file satisfying a requested search condition based on item information obtained by associating the items and the number of files including the items, and file information indicating whether or not each of the files includes each item, and upon receipt of a deletion request of a file, update the number of files of items included in the file of a deletion target in the item information, and, when the number of files becomes 0, deletes an item whose number of files becomes 0 and the number of files including the item from the item information.

13 Claims, 21 Drawing Sheets

(56) References Cited

U.S. PATENT DOCUMENTS

| | | | | |
|---|---|---|---|---|
| 2006/0265389 A1* | 11/2006 | Yamahata | .......... | G06F 17/30011 |
| 2007/0198616 A1* | 8/2007 | Goto | .................. | G06F 17/30153 |
| 2009/0169001 A1* | 7/2009 | Tighe | ......................... | H04L 9/34 |
| | | | | 380/217 |
| 2009/0222420 A1* | 9/2009 | Hirata | ................ | G06F 17/30126 |
| 2009/0282003 A1* | 11/2009 | Hirata | ................ | G06F 17/30126 |
| 2010/0146450 A1* | 6/2010 | Harada | ............. | G06F 17/30126 |
| | | | | 715/838 |

FOREIGN PATENT DOCUMENTS

| | | |
|---|---|---|
| JP | 2000-242536 | 9/2000 |
| JP | 2007-34878 | 2/2007 |

\* cited by examiner

FIG. 3

12a: ITEM NAME DICTIONARY TABLE
(ITEM INFORMATION)

| ID (IDENTIFIER), | ITEM NAME (ITEM), | THE NUMBER OF FILES INCLUDING ITEM |
|---|---|---|
| 1, | Name, | 2 |
| 2, | Address, | 2 |
| 3, | Age, | 1 |
| 4, | Gender, | 1 |
| ... | ... | ... |

FIG. 4

12b: SORTED ITEM NAME DICTIONARY TABLE
(SORTED ITEM INFORMATION)

| ITEM NAME (ITEM), | ID (IDENTIFIER) |
|---|---|
| Address, | 2 |
| Age, | 3 |
| Gender, | 4 |
| Name, | 1 |
| ... | ... |

FIG. 5

12c: ITEM NAME BIT MANAGEMENT TABLE
(FILE INFORMATION)

| FILE NAME (FILE) | INCLUDED ITEM NAME (BIT SEQUENCE) |
|---|---|
| FILE X, | 1100 0000 0000 0000 |
| FILE Y, | 1111 0000 0000 0000 |
| ... | ... |

BIT POSITION: 1234 5678 ...

FIG. 12

12a: ITEM NAME DICTIONARY TABLE

| ID (IDENTIFIER) | ITEM NAME (ITEM) | THE NUMBER OF FILES INCLUDING ITEM |
|---|---|---|
| 1, | Name, | 0→2 |
| 2, | Address, | 0→2 |
| 3, | Age, | 0→1 |
| 4, | Gender, | 0→1 |
| ... | ... | ... |

12b: SORTED ITEM NAME DICTIONARY TABLE

| ITEM NAME (ITEM) | ID (IDENTIFIER) |
|---|---|
| Address, | 2 |
| Age, | 3 |
| Gender, | 4 |
| Name, | 1 |
| ... | ... |

12c: ITEM NAME BIT MANAGEMENT TABLE

| FILE NAME (FILE) | INCLUDED ITEM NAME (BIT SEQUENCE) |
|---|---|
| FILE X, | 1100 0000 0000 0000 |
| FILE Y, | 1111 0000 0000 0000 |
| ... | ... |

FIG. 15

12a: ITEM NAME DICTIONARY TABLE

| ID (IDENTIFIER), | ITEM NAME (ITEM), | THE NUMBER OF FILES INCLUDING ITEM |
|---|---|---|
| 1, | Name, | 2→1 |
| 2, | Address, | 2→1 |
| 3, | Age, | 1→0 |
| 4, | Gender, | 1→0 |
| ... | ... | |

12b: SORTED ITEM NAME DICTIONARY TABLE

| ITEM NAME (ITEM), | ID (IDENTIFIER), |
|---|---|
| Address, | 2 |
| Age, | 3 |
| Gender, | 4 |
| Name, | 1 |
| ... | ... |

12c: ITEM NAME BIT MANAGEMENT TABLE

| FILE NAME (FILE), | INCLUDED ITEM NAME (BIT SEQUENCE) |
|---|---|
| FILE X, | 1100 0000 0000 0000 |
| FILE Y, | 1111 0000 0000 0000 |
| ... | |

FIG. 17

12a': ITEM NAME DICTIONARY TABLE (ITEM INFORMATION)

| ID (IDENTIFIER), | ITEM NAME (ITEM), | THE NUMBER OF FILES INCLUDING ITEM | TOTAL FILE SIZE |
|---|---|---|---|
| 1, | Name, | 1000 | 200MB |
| 2, | Address, | 800 | 1GB |
| ... | ... | ... | ... |

FIG. 18

12c': ITEM NAME BIT MANAGEMENT TABLE (FILE INFORMATION)

| FILE NAME (FILE) | INCLUDED ITEM NAME (BIT SEQUENCE) | FILE SIZE |
|---|---|---|
| FILE X, | 1100 0000 0000 0000 | 10MB |
| FILE Y, | 1111 0000 0000 0000 | 1MB |
| ... | ... | |

BIT POSITION: 1234 5678 ...

INFORMATION PROCESSING APPARATUS, FILE MANAGEMENT METHOD, AND COMPUTER-READABLE RECORDING MEDIUM HAVING STORED THEREIN FILE MANAGEMENT PROGRAM

CROSS-REFERENCE TO RELATED APPLICATION

This application is a continuation application of International Application PCT/JP2012/066142 filed on Jun. 25, 2012 and designated the U.S., the entire contents of which are incorporated herein by reference.

FIELD

The present invention relates to an information processing apparatus, a file management method and a computer-readable recording medium having stored therein a file management program.

BACKGROUND

FIG. 19 illustrates a view illustrating an example of a flat file. FIG. 20 illustrates a view illustrating an example of extraction of records from flat files. A flat file is, for example, a file which holds information including a plurality of items (item names) of a Comma Separated Values (CSV) format or an eXtensible Markup Language (XML) format, and holds a plurality of records of the CSV format as illustrated in, for example, FIG. 19. In a record, a plurality of items (columns) is partitioned by delimiters such as commas. According to a system which uses flat files, formats (e.g. columns) of data of flat files may momentarily change, the files can be stored as is without falsification and a Relational DataBase (RDB) scheme definition does not need to be determined in advance.

As illustrated in, for example, FIG. 20, records including items of {"name", "address", "age"} are held in a file 1, an item of a "blood type" is added in a file 2, and an item of an "age" which becomes unnecessary is deleted from a file 3. Thus, the system which uses flat files can extract records matching search conditions (e.g. a "mountain" is included in an item of a "name") specified by a user, from a plurality of files 1 to 3 having different data formats.

A system which accumulates a various items of and a great amount of operation data in a flat file data storage and takes advantage of the data is used in terms of the above advantage. For example, this system is used to manage, for example, journal data of an Automatic Teller Machine (ATM) upon analysis of sales data and inventory data of a Point Of Sale (POS) system and placement of an order.

By the way, when a great amount of non-typical data is stored, the system which uses flat files is demanded to search for (extract) operation data at a high speed and takes an advantage of the operation data as appropriate. In addition, the non-typical data is data including various changes in columns and is, for example, table data or journal data in Portable Document Format (PDF) document. FIG. 21 illustrates a view for explaining an example of a process of narrowing down record extraction target flat files. In addition, a flat file will be simply referred to as a file below.

As illustrated in FIG. 21, the system includes a file storage region in which files are stored, and a management region (management database (DB)) in which meta information of the files is held.

Upon storage of a file, the system determines in advance an item name (e.g. "item 1") which serves as a key to be used to narrow down files. Upon receipt of a storing request of the file 1 from the user (step S101), the system obtains information of the "item 1" (e.g. maximum value: 10 and minimum value: 2 of a column) which is an item which serves as a key when the file 1 is opened (step S102). Further, the system stores the obtained information of the "item 1" as meta information in the management region, and stores the file 1 in the file storage region (step S103).

Next, upon receipt of an extraction request of data (record) satisfying "item 1>13" as search conditions from the user (step S104), the system makes an inquiry to a management DB (step S105) and removes files of meta information which do not match the search conditions, from search targets. In addition, in case of FIG. 21, a maximum value of the "item 1" of the file 1 is 10 and a maximum value of the "item 1" of the file 2 is 15. Therefore, the file 1 which does not satisfy the search conditions of "item 1>13" is removed from search targets. Further, the system opens only the file 2 stored in the file storage region, and performs a process of extracting records matching the search conditions from the file 2 (step S106).

Thus, in the example illustrated in FIG. 21, files which do not need to be searched are removed from a great amount of stored files and search target files are narrowed down. Consequently, speeding up data search is realized.

In addition, a relevant technique is, for example, a technique of adding secondary information such as a keyword for searching for primary information, to this primary information obtained by converting document into an image signal to store and register in a memory, and searching for and reading the necessary primary information from the memory using this secondary information (e.g. following Patent Literature 1).

This technique sequentially stores material numbers of primary information which needs to be registered, in a material number list file in which material numbers of primary information including keywords are stored per keyword upon registration. Further, this technique creates, for keywords in the secondary information which are search conditions, a bit map memory in which bits are allocated using keyword seeds and material numbers as addresses upon search, and reads from the memory only the primary information found based on the bit map memory.

Patent Document 1: Japanese Laid-open Patent Publication No. 01-237723

Patent Document 2: Japanese Laid-open Patent Publication No. 2000-242536

In the above example illustrated in FIG. 21, when an item name which serves as a key is not included in the search conditions, all files stored in the file storage region are search targets. That is, when an item name which serves as a key is not included in the search conditions, open cost of a file increases since it is difficult to narrow down files compared to a case where an item name which serves as a key is included in the search conditions, and a search response lowers.

Further, the above relevant technique does not take into account that primary information is deleted from a management table (the material number list files and the bit map memory). That is, information of the management table is not configured to be updated in response to, for example, deletion of the primary information. Therefore, when the primary information is repeatedly registered and deleted, an unnecessary process of reading non-existent primary information occurs and a search response lowers.

SUMMARY

According to an aspect of embodiments, an information processing apparatus which manages a file which holds information including a plurality of items, the information processing apparatus including a processor, the processor configured to: search for a file satisfying a requested search condition based on item information obtained by associating the items and the number of files including the items, and file information indicating whether or not each of the files includes each item, and upon receipt of a deletion request of a file, update the number of files of items included in the file of a deletion target in the item information, and, when the number of files becomes 0, deletes an item whose number of files becomes 0 and the number of files including the item from the item information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 illustrates a view illustrating an example of an item name dictionary table to be stored in a management region illustrated in FIG. 1.

FIG. 4 illustrates a view illustrating an example of a sorted item name dictionary table stored in the management region illustrated in FIG. 1.

FIG. 5 illustrates a view illustrating an example of an item name bit management table stored in the management region illustrated in FIG. 1.

FIG. 12 illustrates a view for explaining an example of a process of updating each table in the storage unit illustrated in FIG. 1.

FIG. 15 illustrates a view for explaining an example of a process of updating each table in the deleting unit illustrated in FIG. 1.

FIG. 17 illustrates a view illustrating an item name dictionary table according to a second modified example of one embodiment.

FIG. 18 illustrates a view illustrating an item name bit management table according to the second modified example of one embodiment.

DESCRIPTION OF EMBODIMENTS

An embodiment will be described below with reference to the drawings.

[1] Embodiment

[1-1] Explanation of Information Processing Apparatus

Figure 1:
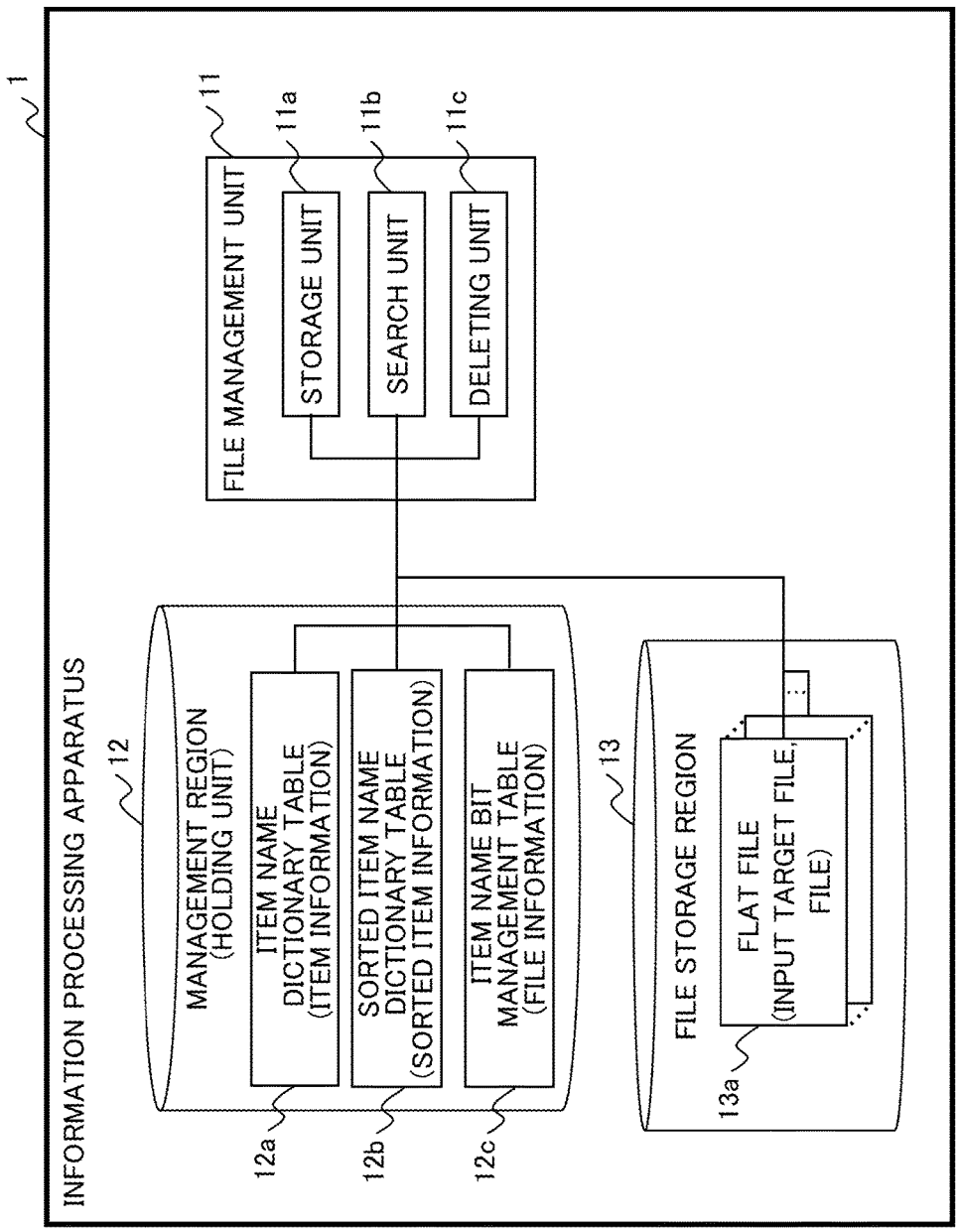
FIG. 1 illustrates a block diagram illustrating a functional configuration example of an information processing apparatus according to one embodiment.

FIG. 1 illustrates a block diagram illustrating a functional configuration example of an information processing apparatus 1 according to one embodiment. The information processing apparatus 1 manages a plurality of flat files 13a which holds information including a plurality of items, and has a file management unit 11, a management region 12 and a file storage region 13 as illustrated in FIG. 1.

Figure 2:
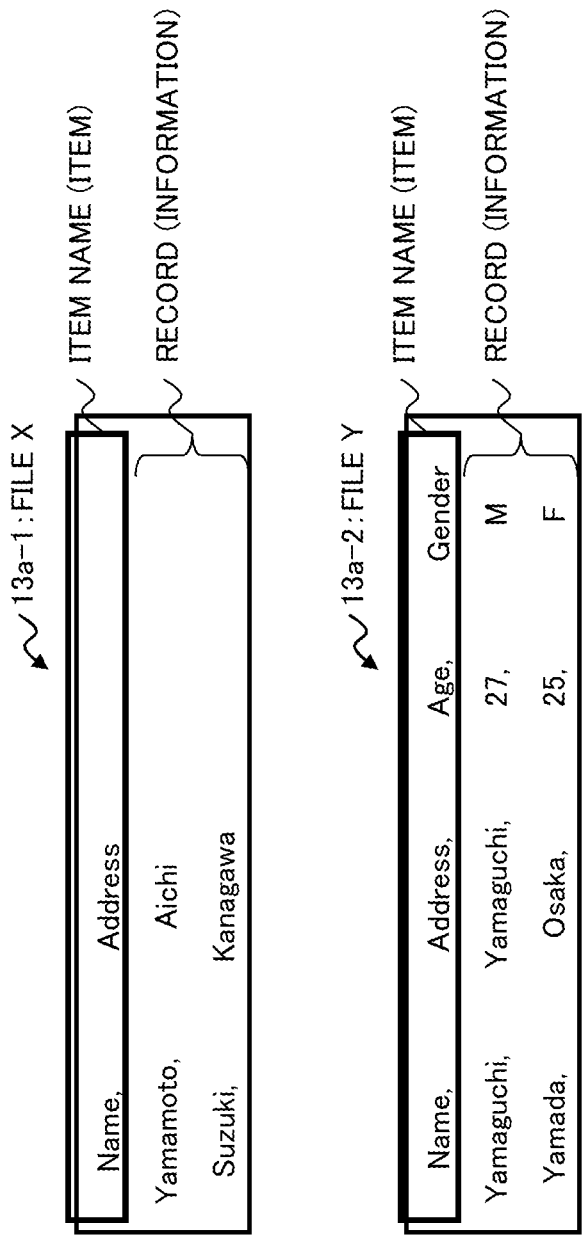
FIG. 2 illustrates a view illustrating an example of data structures of flat files to be stored in a file storage region illustrated in FIG. 1.

The file storage region 13 is a region in which the flat files 13a are stored. Storage regions of various devices such as a Hard Disk Drive (HDD) or a Solid State Drive (SSD) can be used for the file storage region 13. FIG. 2 illustrates a view illustrating an example of data structures of the flat files 13a to be stored in the file storage region 13.

The flat file (file) 13a is an input target file which holds information including a plurality of items (item names) in the CSV format or the XML format, and holds a plurality of records in the CSV format as illustrated in, for example, FIG. 2. In a record, a plurality of items is separated by delimiters such as commas. In addition, the flat file 13a will be referred to simply as the file 13a below. Further, in the following description, a file 13a-1 and a file 13a-2 illustrated in FIG. 2 are stored as the files 13a in the file storage region 13. In addition, the file 13a-1 and the file 13a-2 are referred to as a file X and a file Y, respectively in some cases.

Items held in the file 13a are separated by commas between { } of "item name { }", and records held in the file 13a are separated by commas between { } of "record { }". In, for example, FIG. 2, the file 13a-1 holds two records of {"Yamamoto", "Aichi"} and {"Suzuki", "Kanagawa"} as item names {"Name", "Address"}. Further, the file 13a-2 holds two records of {"Yamaguchi", "Yamaguchi", "27", "M"} and {"Yamada", "Osaka", "25", "F"} as item names {"Name", "Address", "Age", "Gender"}.

The management region (holding unit) 12 is a region in which tables 12a to 12c for managing the files 13a are stored. For example, a storage region such as a volatile-memory such as a Random Access Memory (RAM) can be used as the management region 12. In addition, the tables 12a to 12c may be databases or files. FIGS. 3 to 5 are views illustrating an example of the item name dictionary table 12a, the sorted item name dictionary table 12b and the item name bit management table 12c stored in the management region 12, respectively.

The item name dictionary table (item information) 12a is information in which IDs (identifiers), item names (items)

and the numbers of files including the item names, and is a table which manages all item names included in the file 13a. In the example illustrated in FIG. 3, in the item name dictionary table 12a, IDs are allocated to all item names included in the files 13a-1 and 13a-2 illustrated in FIG. 2, and the number of files including the item names are held. For example, in the item name dictionary table 12a, "ID=1" is allocated to "item name=Name", and records in which "the number of files=2" of the files 13a-1 and 13a-2 including item names (items) of "Name" are set are held. In addition, the item name dictionary table 12a is updated by a storage unit 11a and a deleting unit 11c described below.

The sorted item name dictionary table (sorted item information) 12b is a table which includes item names which are a plurality of item names included in the item name dictionary table 12a and sorted in predetermined order, and IDs (identifiers) corresponding to the item names. In the example illustrated in FIG. 4, the sorted item name dictionary table 12b holds item names which are the item names included in the item name dictionary table 12a illustrated in FIG. 3 and which are sorted in ascending order, and IDs corresponding to the item names.

The item name bit management table (file information) 12c is a table which indicates whether or not each item is included per file 13a, and holds as a bit sequence whether or not there is each item included in the files 13a stored in the file storage region 13 per file 13a. This bit sequence indicates whether or not the file 13a includes an item corresponding to an ID according to whether a value of a bit position corresponding to the ID is valid or invalid.

In, for example, the example illustrated in FIG. 5, in the item name bit management table 12c, a value of a bit position corresponding to an ID of an item included in the file 13a is set to valid (e.g. "1") per file X and Y, and bit sequences in which values of other bit positions are set to invalid (e.g. "0") are held. For example, the item name bit management table 12c holds a bit sequence in which values of bit positions of a first bit and a second bit corresponding to IDs are "1" and values of other bit positions are "0" in the file X including the item name "Name" whose ID is "1" and the item name "Address" whose ID is "2" (see FIG. 3). In addition, a width of a bit sequence (the maximum number of bits) is preferably a maximum value of an ID which could increase in the future or more.

The file management unit 11 manages the files 13a and the tables 12a to 12c, searches for the files 13a which hold records (information) satisfying search conditions according to a search request, and extracts records (information) satisfying the search conditions, from the searched files 13a. Hence, the file management unit 11 has the storage unit 11a, a search unit 11b and the deleting unit 11c.

Upon receipt of a storing request of the file 13a from the user or the like, the storage unit 11a collects all item names included in the storage target file 13a, updates the tables 12a to 12c in the management region 12 and stores the storage target file 13a in the file storage region 13.

More specifically, upon receipt of the storing request of the file 13a, the storage unit 11a extracts all item names from the storage target file 13a. Further, the storage unit 11a allocates an ID (e.g. a minimum integer) which does not overlap other item names, to an extracted item name, sets an "item name" and "ID" to the item name dictionary table 12a illustrated in FIG. 3 and sets 1 to "the number of files including item". In addition, when there is already an extracted item in the item name dictionary table 12a, the storage unit 11a does not allocate an ID and adds 1 to "the number of files including item" corresponding to the extracted item name.

Figure 6:
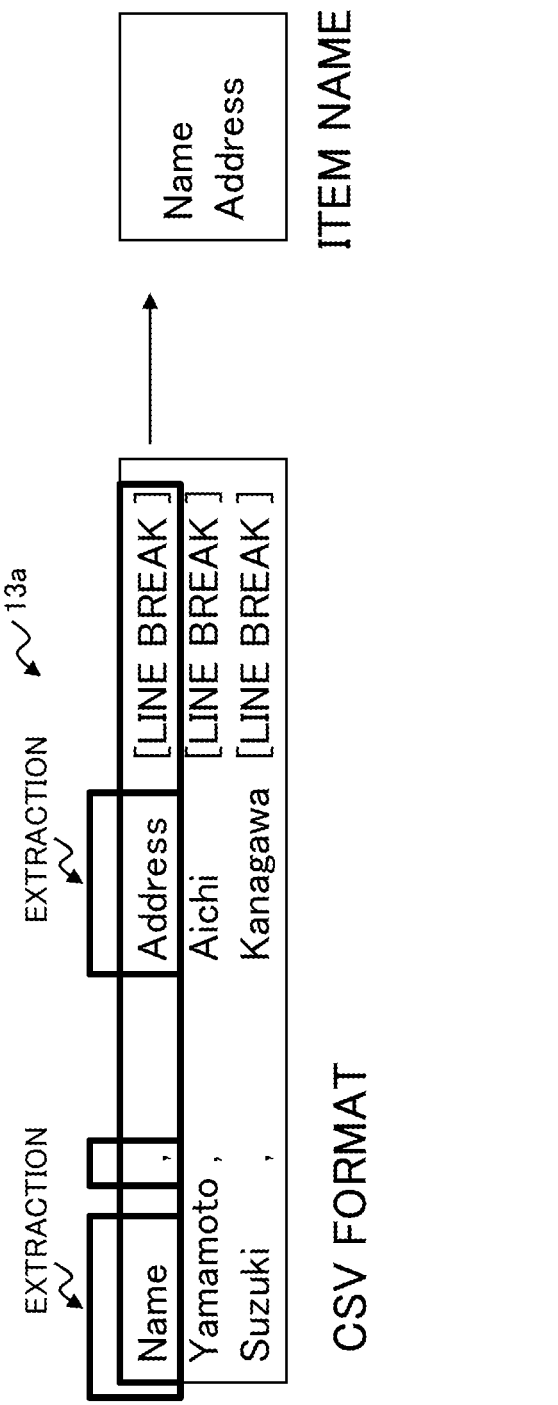
FIG. 6 illustrates a view for explaining an example of a process of extracting an item name from a flat file of a CSV format in a storage unit illustrated in FIG. 1.
Figure 7:
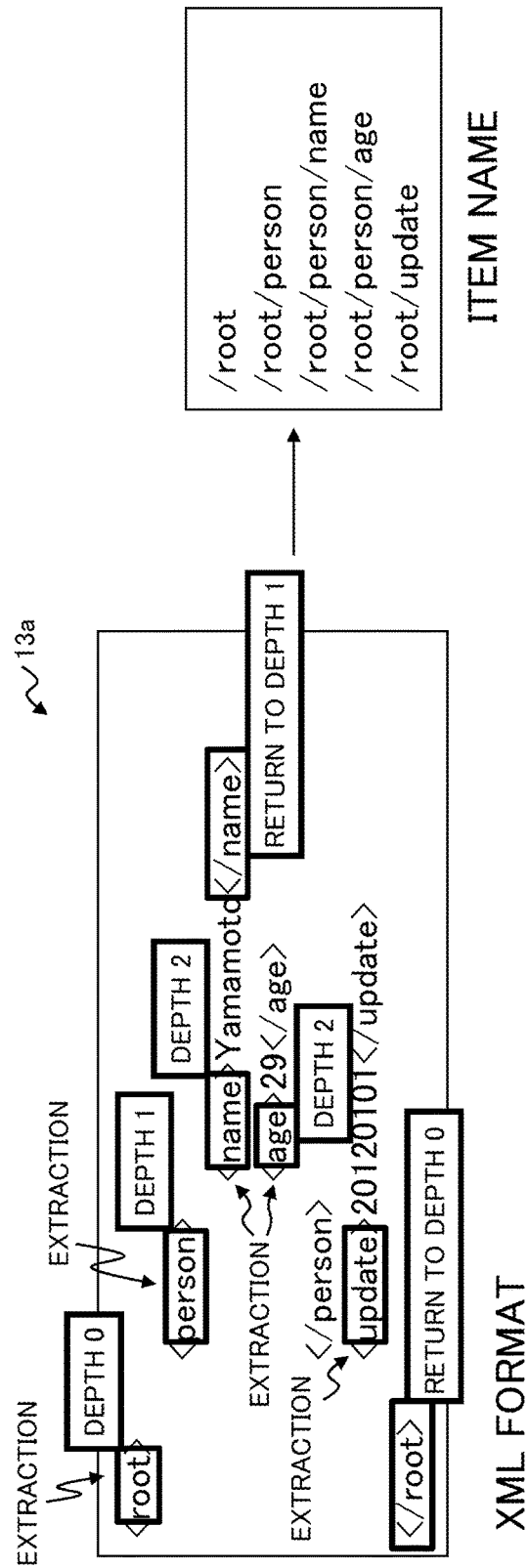
FIG. 7 illustrates a view for explaining an example of a process of extracting an item name from a flat file of an XML format in the storage unit illustrated in FIG. 1.

Hereinafter, a process of extracting (obtaining) item names from the file 13a by the storage unit 11a will be described with reference to FIGS. 6 and 7. FIGS. 6 and 7 are views for explaining an example of the process of extracting item names from the file 13a of the CSV format and the XML format by the storage unit 11a, respectively.

When the storage target file 13a is a file of the CSV format, the storage unit 11a reads the file 13a from the head of the first row to a line break, divides a character string before and after a detected delimiter on the occasion of detection of the predetermined delimiter (e.g. comma ","), and extracts divided character strings (item names: "Name" and "Address" in the example illustrated in FIG. 6).

Further, when the search target file 13a is a file of the XML format, the storage unit 11a reads description contents (element names; "root", "person", "name" and "age" in the example illustrated in FIG. 7) between "<" and ">" in order from the head of the file 13a, and increments a layer depth. Furthermore, the storage unit 11a decrements the layer depth upon detection of "<" and ">" (e.g. "</name>", "</age>" and "</person>" in the example illustrated in FIG. 7). Still further, the storage unit 11a repeatedly reads the description contents between "<" and ">" until the layer depth becomes "0", and extracts item names.

In addition, records (information) held in the above file 13a includes records held in the file 13a of the CSV format illustrated in FIG. 6 and, in addition, data between a start tag and an end tag held in the file 13a of the XML format illustrated in FIG. 7. In addition, the process of extracting item names from the file 13a by the storage unit 11a is not limited to the above procedure, and can be performed by known various methods and will not be described in detail.

Further, when there are an item name and an ID newly added to the item name dictionary table 12a, the storage unit 11a adds a pair of these item name and ID to the sorted item name dictionary table 12b. In this regard, the storage unit 11a adds a pair of an item name and an ID to be added such that item names included in the sorted item name dictionary table 12b are arranged in predetermined order.

In addition, when there are an item name and an ID newly added to the item name dictionary table 12a, the storage unit 11a may delete the existing sorted item name dictionary table 12b, and newly create the sorted item name dictionary table 12b based on the updated item name dictionary table 12a. In this case, the storage unit 11a sorts all item names included in the item name dictionary table 12a, in predetermined order (in, for example, alphabetical order, in the order of the 50-character kana syllabary, in ascending order or in descending order), creates the sorted item name dictionary table 12b including the sorted item names and IDs corresponding to the item names, and stores the sorted item name dictionary table 12b in the management region 12.

Further, the storage unit 11a adds a file name of the storage target file 13a and the above bit sequence indicating whether or not there is each item included in the storage target file 13a, to the item name bit management table 12c.

Thus, upon storage of the file 13a, the storage unit 11a collects all item names included in the file 13a and collectively manages the item names using the respective tables 12a to 12c.

The search unit 11b searches for the files 13a satisfying the requested search conditions based on the item name dictionary table 12a or the sorted item name dictionary table 12b held in the management region 12, and the file storage region 13.

More specifically, the search unit 11b specifies an ID of an item included in the search conditions based on the item name dictionary table 12a and the sorted item name dictionary table 12b. Further, the search unit 11b extracts (narrows down) the search target files 13a whose values of bit positions corresponding to the specified ID are valid, based on the item name bit management table 12c, and searches for the file 13a satisfying the search conditions from the extracted files 13a.

A case where, when, for example, the item name dictionary table 12a and the sorted item name dictionary table 12b hold the records illustrated in FIGS. 3 and 4, the search unit 11b receives a search request based on the search conditions of "Name"="Yamamoto" AND Age=="29" is assumed. In this case, the search unit 11b specifies IDs of "Name" and "Age" which are item names included in the search conditions, as "1" and "3" based on the item name dictionary table 12a or the sorted item name dictionary table 12b.

In addition, the search unit 11b can use one of the item name dictionary table 12a and the sorted item name dictionary table 12b as a table for specifying IDs of items included in the search conditions. When the search unit 11b uses the sorted item name dictionary table 12b, item names can be sorted in predetermined order. Consequently, it is possible to speed up search for "Name" and "Age" which are item names included in the search conditions. A case where the search unit 11b uses the sorted item name dictionary table 12b will be described below. In addition, when the search unit 11b uses the item name dictionary table 12a, the management region 12 may omit storing the sorted item name dictionary table 12b, and the search unit 11b and the deleting unit 11c described below can skip a process of creating or updating the sorted item name dictionary table 12b.

Figure 8:
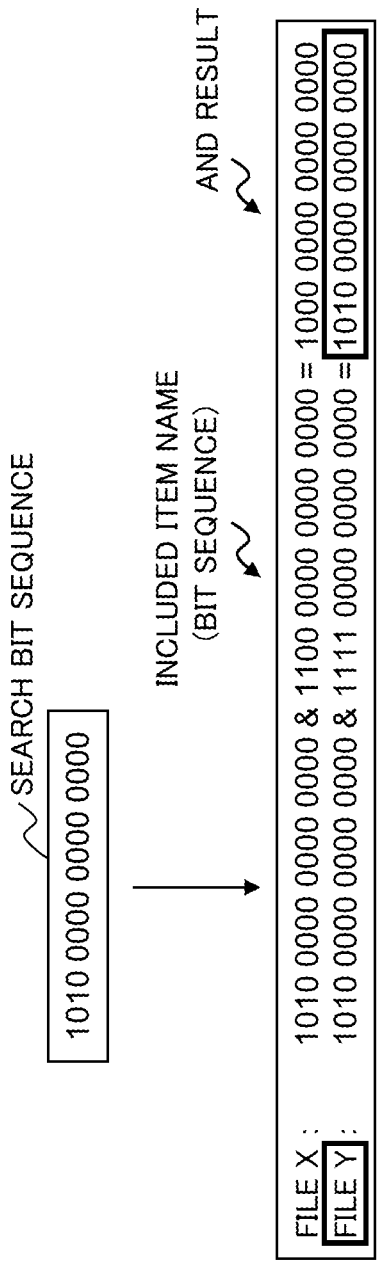
FIG. 8 illustrates a view for explaining an example of a process of narrowing down files in a search unit illustrated in FIG. 1.

Next, details of a process of narrowing down the search target files 13a based on specified IDs by the search unit 11b will be described. FIG. 8 illustrates a view for explaining an example of a process of narrowing down files by the search unit 11b.

When specifying IDs of items included in the search conditions based on the sorted item name dictionary table 12b, the search unit 11b generates a search bit sequence whose values of bit positions corresponding to specified IDs are made valid. When, for example, specifying IDs of "Name" and "Age" which are item names included in the search conditions as "1" and "3", the search unit 11b generates a search bit sequence whose values of bit positions of the first bit and the third bit are "1" and whose values of other bit positions are "0" (see FIG. 8). In addition, a width of a search bit sequence (a maximum number of bits) is preferably the same as the width of the bit sequence of the item name bit management table 12c.

Next, the search unit 11b calculates AND (product) of the search bit sequence and each bit sequence of the item name bit management table 12c, and extracts (narrows down) the files 13a whose calculated products correspond to the bit sequence matching the search bit sequence. Further, the search unit 11b specifies the extracted files 13a as the search target files 13a, and searches for files satisfying the search conditions, from the search target files 13a. In the example illustrated in FIG. 8, an AND result of the search bit sequence and the bit sequence of the file Y matches the search bit sequence. Therefore, the search unit 11b specifies the file Y as the search target file 13a, and determines whether or not the file Y holds records satisfying the search conditions by opening the file Y and reading the records.

In addition, the file Y illustrated in FIG. 8 includes "Name" and "Age" which are item names included in the search conditions as illustrated in FIG. 2. However, the file Y does not hold records satisfying the search conditions of "Name"="Yamamoto" AND Age=="29". Hence, in this case, the search unit 11b provides to the user an output indicating that there is not the file 13a as the search result of the file 13a satisfying the search conditions. Meanwhile, when, for example, the file Y holds the records satisfying the search conditions, the search unit 11b extracts the records satisfying the search conditions from the file Y, and outputs the extracted records as a search result to the user.

In addition, a mode to output a search result can be realized by various known methods of displaying the search result on a monitor or the like which is not illustrated, or creating a table which holds extracted records and storing the table in a predetermined storage region, and will not be described in detail.

Thus, the search unit 11b removes the files 13a which do not include records matching the search conditions of interest, from search targets and narrows down the search targets by cross-checking the item name bit management table 12c which holds item names included in the files 13a to be stored as bit sequences, and the search conditions specified by the user.

Upon receipt of a deletion request of the file 13a, the deleting unit 11c deletes records (information) related to the deletion target files 13a from the item name bit management table 12c, and updates the number of files of the items included in the deletion target file 13a from the item name dictionary table 12a.

More specifically, the deleting unit 11c specifies a bit position whose value is valid in the bit sequence corresponding to the file 13a to be deleted, in the item name bit management table 12c, and deletes the bit sequence corresponding to the file 13a to be deleted. Further, the deleting unit 11c subtracts 1 from the number of files of the item corresponding to the specified bit position, in the item name dictionary table 12a.

Furthermore, when the number of files becomes 0 as a result of subtracting 1 from the number of files, the deleting unit 11c deletes the records whose numbers of files become 0, i.e., item names (items), IDs corresponding to the item names and the numbers of files including the items, from the item name dictionary table 12a. Still further, the deleting unit 11c deletes the records whose numbers of files become 0, i.e., item names (items) and the IDs corresponding to the item names, from the sorted item name dictionary table 12b.

Moreover, the deleting unit 11c deletes the deletion target file 13a.

In addition, the deleting unit 11c fills invalid bit positions in all bit sequences when there are invalid bit positions whose values are invalid in the bit sequences of all files 13a in the item name bit management table 12c.

Upon, for example, receipt of a deletion request of the file Y illustrated in FIG. 2, the deleting unit 11c specifies that the first bit to the fourth bit in the item name bit management table 12c illustrated in FIG. 5 are valid in the file Y, and deletes records of the file Y. In this case, there is no bit sequence whose third bit and fourth bit corresponding to the IDs "3" and "4" are valid in the item name bit management table 12c. Hence, the deleting unit 11c fills the third bit and the fourth bit which are the invalid bit positions in all bit sequences of the item name bit management table 12c, i.e., deletes bits at invalid bit positions and shifts one or more bits lower than the invalid bit positions towards an upper side by the number of deleted bits. In addition, when there is a record whose number of files becomes 0 in the item name dictionary table 12a, the deleting unit 11c can detect an ID corresponding to an item whose number of files becomes 0 as an invalid bit position.

Further, the deleting unit 11c fills, i.e., moves up IDs of records subsequent to a record deleted from the item name dictionary table 12a and the sorted item name dictionary table 12b such that IDs corresponding to item names and bit positions of bit sequences are not shifted when invalid bit positions are filled.

[1-2] Hardware Configuration Example of Information Processing Apparatus

Next, a hardware configuration example of the information processing apparatus 1 according to the present embodiment will be described with reference to FIG. 9. In addition, FIG. 9 illustrates a block diagram illustrating the hardware configuration example of the information processing apparatus 1 illustrated in FIG. 1.

Figure 9:
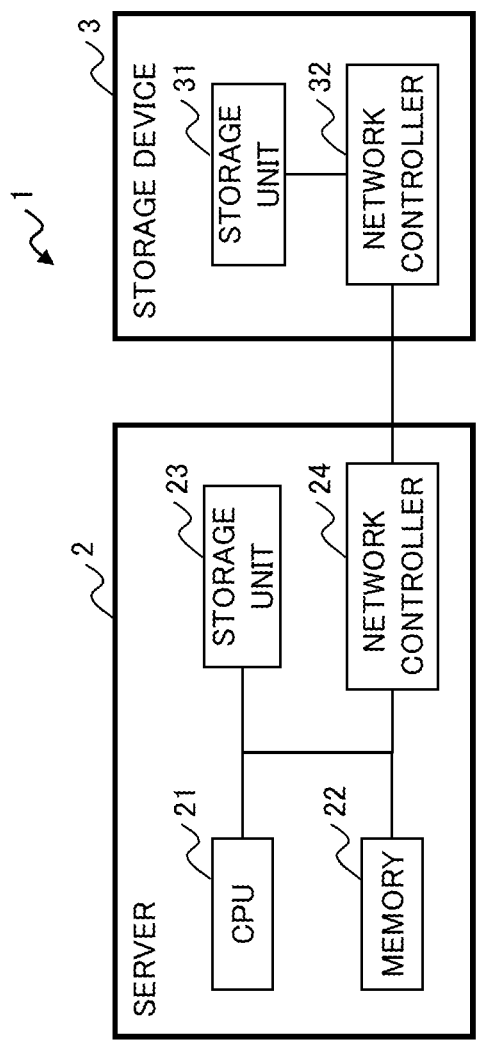
FIG. 9 illustrates a block diagram illustrating a hardware configuration example of an information processing apparatus illustrated in FIG. 1.

As illustrated in FIG. 9, the information processing apparatus 1 has a server 2 and a storage device 3. The server 2 is an electronic computer which operates as the information processing apparatus 1, and has a Central Processing Unit (CPU) 21, a memory 22, a storage unit 23 and a network controller 24. Further, the storage device 3 is connected with the server 2 through a network, and has a storage unit 31 and a network controller 32.

The CPU 21 is connected with the memory 22, the storage unit 23 and the network controller 24 through a bus (and, for example, a controller), respectively and is a processing device which performs various types of control and computation. The CPU 21 realizes various functions by executing programs stored in the memory 22 or, for example, a Read Only Memory (ROM) which is not illustrated.

For example, the CPU 21 according to the present embodiment realizes a function of the above file management unit 11.

The memory 22 is a memory device which temporarily stores various items of data and programs, and temporarily stores and expands the data and the programs when the CPU 21 executes a program. In addition, the memory 22 is a volatile memory such as a RAM.

Further, in the memory 22 according to the present embodiment, at least part of a storage region is used as the above management region 12 and each of the tables 12a to 12c stored in the storage unit 23 and/or 31 described below is expanded.

The storage unit 23 and 31 are various devices such as a magnetic disk device such as a HDD or a semiconductor drive device such as a SSD.

In the storage unit 23 and/or 31 according to the present embodiment, at least part of the storage region is used as the above file storage region 13, and a plurality of files 13a and each of the tables 12a to 12c which are not yet expanded in the memory 22 are stored. In addition, the CPU 21 (file management unit 11) performs a process of, for example, storing the files 13a, reading the search target files 13a and deleting the files 13a from the file storage region 13.

The network controllers 24 and 32 are controllers which control interfaces between connection destinations and the network controllers and perform various types of data communication.

[1-3] Operation Example of Information Processing Apparatus

Figure 10:
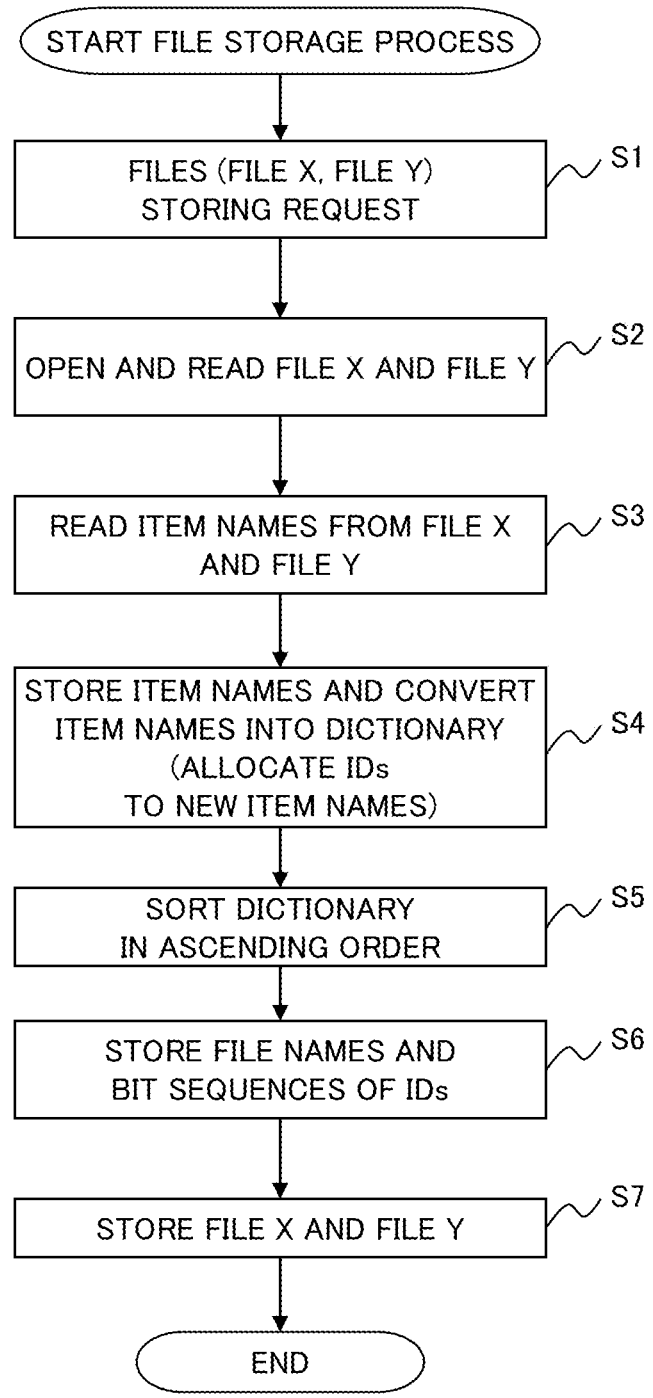
FIG. 10 is a flowchart for explaining an example of a file storage process in the storage unit illustrated in FIG. 1.
Figure 11:
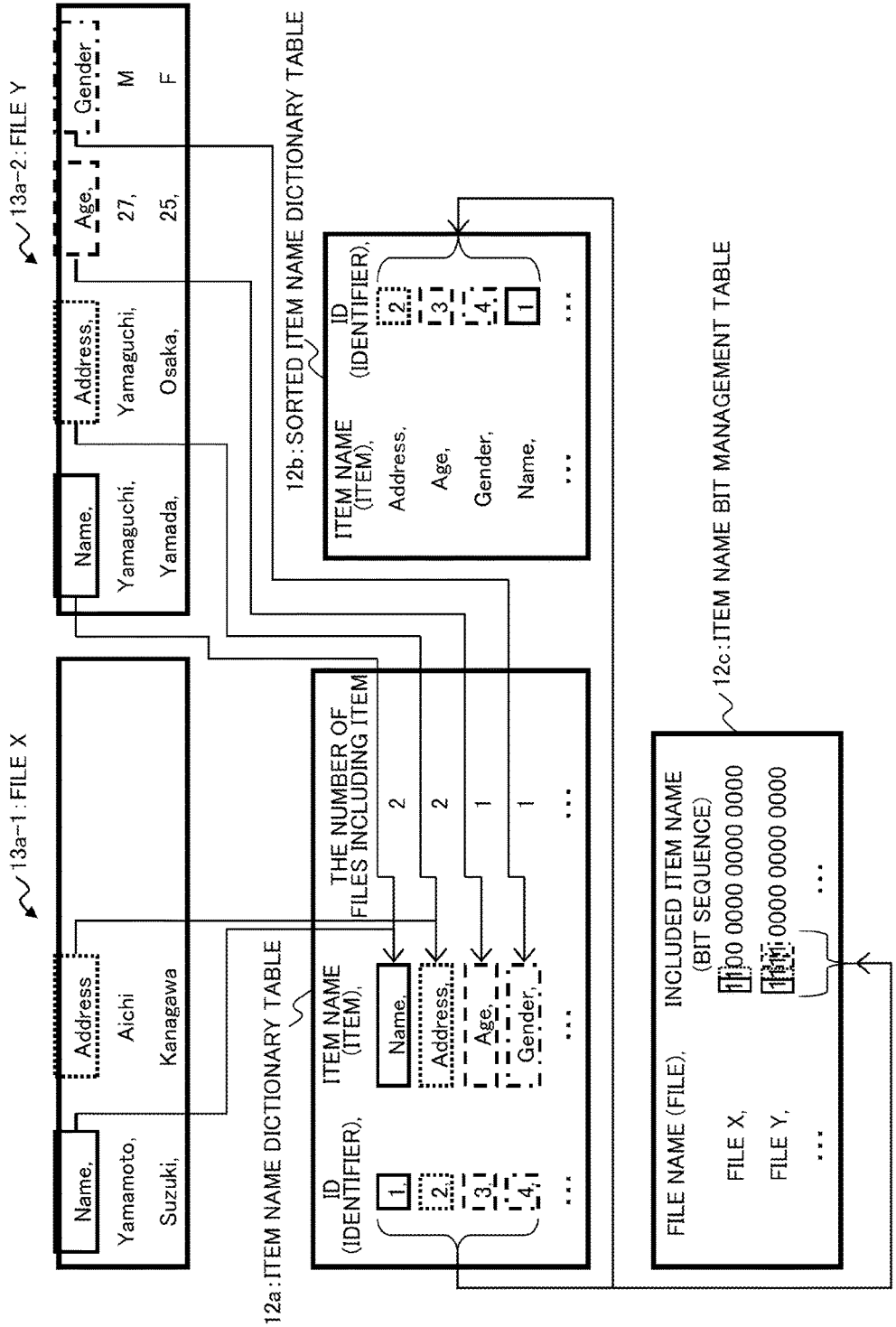
FIG. 11 illustrates a view for explaining a relationship between flat files illustrated in FIG. 1 and each table.
Figure 13:
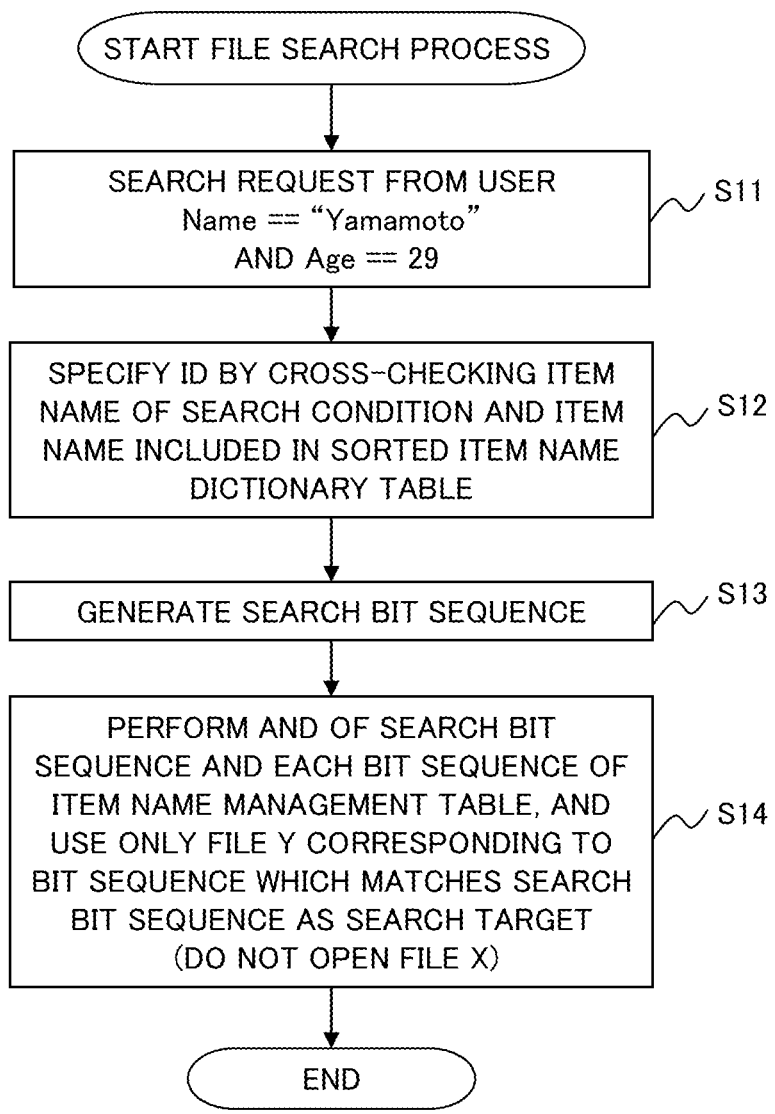
FIG. 13 is a flowchart for explaining an example of the file search process in the search unit illustrated in FIG. 1.
Figure 14:
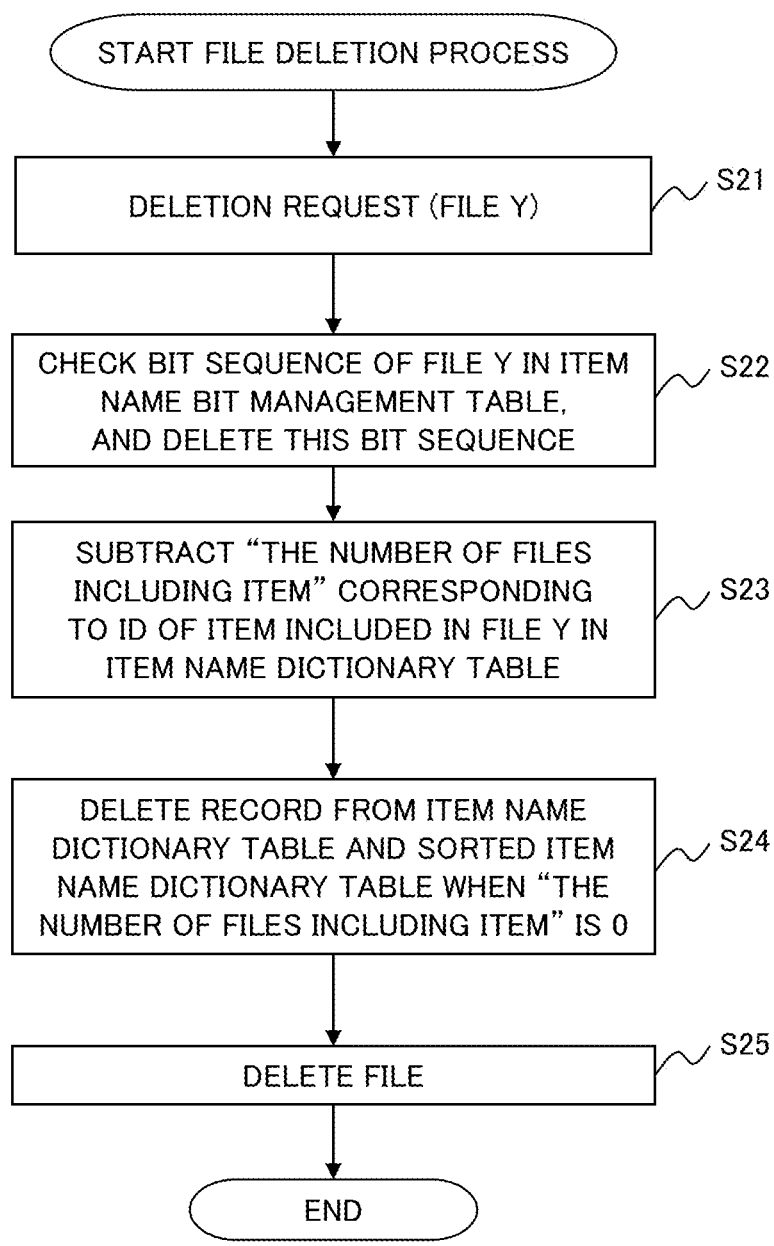
FIG. 14 is a flowchart for explaining an example of a file deletion process in a deleting unit illustrated in FIG. 1.

Next, an operation example of the information processing apparatus 1 configured as described above will be described with reference to FIGS. 10 to 15. FIG. 10 is a flowchart for explaining an example of a file storage process in the storage unit 11a. FIG. 11 illustrates a view for explaining a relationship between the files 13a and each of the tables 12a to 12c. FIG. 12 illustrates a view for explaining an example of a process of updating each of the tables 12a to 12c by the storage unit 11a, and illustrates a view illustrating a process when a storing request of the file X and the file Y is made. FIG. 13 is a flowchart for explaining an example of the file search process in the search unit 11b. FIG. 14 is a flowchart for explaining an example of a file deletion process in the deleting unit 11c. FIG. 15 illustrates a view for explaining an example of a process of updating each of the tables 12a to 12c by the deleting unit 11c, and illustrates a view illustrating a process when a deletion request of the file Y is made.

[1-3-1] File Storage Process

First, an example of the file storage process in the information processing apparatus 1 will be described with reference to FIGS. 10 to 12. In addition, a case where a storing request of the file X and the file Y illustrated in FIG. 2 is received in a state where there is no record in each of the tables 12a to 12c (e.g. a default state of the information processing apparatus 1) is assumed below.

As illustrated in FIG. 10, when the user or the like instructs the storing request of the file X and the file Y (step S1), the storage unit 11a opens and reads the inputs target file X and file Y from the file storage region 13 (step S2). Further, the storage unit 11a extracts item names {"Name", "Address"} from the file X, and {"Name", "Address", "Age", "Gender"} from the file Y (step S3; see FIG. 11). In this regard, the new item names are extracted, and then the storage unit 11a allocates IDs in order from 1 which is a minimum integer and registers the extracted item names in order of {"Name", "Address", "Age", "Gender"} in the item name dictionary table 12a (step S4). Further, the storage unit 11a calculates the numbers of files "2", "2", "1" and "1" of the files 13a including the item names, and sets the numbers of files to the item name dictionary table 12a (see the item name dictionary table 12a in FIGS. 11 and 12).

Furthermore, the storage unit 11a creates or updates the sorted item name dictionary table 12b in which the item names of the item name dictionary table 12a are sorted in predetermined order (e.g. ascending order) (step S5; see the sorted item name dictionary table 12b in FIGS. 11 and 12). Still further, the storage unit 11a stores file names of the file X and the file Y and bit sequences in the item name bit management table 12c (step S6; see the item name bit management table 12c in FIGS. 11 and 12). Finally, the storage unit 11a stores the file X and the file Y in the file storage region 13 (step S7), and finishes the process.

[1-3-2] File Search Process

Next, an example of the file search process in the information processing apparatus 1 will be described with reference to FIG. 13. In addition, the file search process is a process of inquiring the files 13a including items included in the search conditions to extract records (information) satisfying the search conditions. That is, the search target files 13a whose records satisfying the search conditions are searched are specified by the file search process.

As illustrated in FIG. 13, when a search request of a record is instructed based on the search conditions of "Name=="Yamamoto" AND Age==29" by the user or the like (step S11), the search unit 11b cross-matches the item names of the search conditions and the item names included in the sorted item name dictionary table 12b and specifies a relevant ID (step S12). Next, the search unit 11b generates a search bit sequence based on the specified ID (step S13).

Further, the search unit 11b performs AND (product) of the search bit sequence and each bit sequence of the item name bit management table 12c, specifies only the file Y corresponding to a bit sequence whose AND result matches the search bit sequence as a search target (step S14; see FIG. 8) and finishes the process. In addition, in this case, the search unit 11b opens only the file Y, determines whether or not there is a record satisfying the search conditions and outputs a determination result to the user or the like. Meanwhile, the search unit 11b does not open the file X which is the file 13a removed by narrowing down the files.

[1-3-3] File Deletion Process

Next, an example of a file deletion process in the information processing apparatus 1 will be described with reference to FIGS. 14 and 15.

As illustrated in FIG. 14, upon receipt of a deletion request of the file Y from a user or the like (step S21), the deleting unit 11c checks the bit sequence of the file Y in the item name bit management table 12c and deletes the bit sequence (record) (step S22; see the item name bit management table 12c in FIG. 15). Next, the deleting unit 11c subtracts 1 from "the number of files including item" corresponding to the bit position of the bit sequence checked in step S22, i.e., an ID of the item included in the file Y in the item name dictionary table 12a (step S23; see the item name dictionary table 12a in FIG. 15).

When "the number of files including item" in the item name dictionary table 12a becomes 0, the deleting unit 11c deletes this record from the item name dictionary table 12a and the sorted item name dictionary table 12b (step S24; the item name dictionary table 12a and the sorted item name dictionary table 12b in FIG. 15). Meanwhile, the deleting unit 11c does not perform a process on a record whose "the number of files including item" is not 0. Finally, the deleting unit 11c deletes the file Y from the file storage region 13 (step S25), and finishes the process.

As described above, according to the information processing apparatus 1 which is an example of the present embodiment, the search unit 11b searches for the files 13a satisfying the requested satisfying conditions based on the item name dictionary table 12a or the sorted item name dictionary table 12b managed per item name, and the item name bit management table 12c managed per file 13a. That is, the search unit 11b can determine whether or not each of all items is included in each file 13a and can narrow down the search target files 13a without depending on the record search conditions specified by the user unlike the method illustrated in FIG. 21. Thus, by collectively managing item names in each of the tables 12a to 12c, the search unit 11b narrows down the search target files 13a. Consequently, it is possible to reduce open cost of the files 13a and improve search efficiency.

When, for example, item names matching the search conditions are included in n % of the files 13a of all files 13a in the file storage region 13, search performance which is 100/n-fold at maximum (double at maximum in case of n=50 and 100-fold at maximum in case of n=1) is expected. This is more effective particularly when multiplicity of a process of records by the search unit 11b is less.

Further, upon receipt of a deletion request of files, the deleting unit 11c updates the number of files of items included in the deletion target files 13a in the item name dictionary table 12a. Further, when the number of files becomes 0, the deleting unit 11c deletes records whose numbers of files become 0 from the item name dictionary table 12a and the sorted item name dictionary table 12b.

Hence, even when the files 13a are repeatedly registered and deleted, items which do not exist in the files 13a to be stored do not remain in the item name dictionary table 12a. Consequently, even when an item which is not included in all files 13a to be stored is included in search conditions, the search unit 11b can stop searching for the item in the item name dictionary table 12a and efficiently perform a process of specifying an ID corresponding to the item included in the search conditions. Further, the search unit 11b can search for item names included in the search conditions from the item name dictionary table 12a from which unnecessary items (records) are deleted, and can improve performance to search for the item names. Furthermore, the files 13a which do not exist in the search target files 13a are not included. Consequently, it is possible to reduce open cost of the files 13a and search for the files 13a satisfying search conditions at a high speed.

Still further, the deleting unit 11c deletes records related to the deletion target files 13a from the item name bit management table 12c. Hence, when the files 13a are repeatedly registered and deleted, the records corresponding to the files 13a which do not exist in the item name bit management table 12c do not remain. Consequently, the search unit 11b does not read the non-existent files 13a, and it is possible to reduce open cost of the files 13a and search for the files 13a satisfying the search conditions at a high speed.

Thus, the management tables (tables 12a to 12c) are maintained upon registration and deletion of the files 13a. That is, structures of the management tables (tables 12a to 12c) which support not only registration but also deletion of the files 13a can prevent a search response of the search unit 11b from lowering and obtain a stable search response even when the files 13a are repeatedly registered and deleted.

Further, the storage unit 11a allocates item names collected from the storage target files 13a to IDs, and sets the item names to the item name dictionary table 12a. That is, item names are converted into a dictionary and stored. Consequently, it is possible to minimize a data amount and effectively use a storage region.

Further, the search unit 11b uses the sorted item name dictionary table 12b in which item names are sorted in dictionary order and held when specifying IDs corresponding to item names included in search conditions. Consequently, it is possible to limit a search range of the item names and reduce search cost.

Furthermore, the search unit 11b compares a search bit sequence generated based on the search conditions and each bit sequence held in the item name bit management table 12c. Consequently, it is possible to narrow down the search target files 13a at a higher speed than comparison of character strings and reduce comparison cost.

[2] Modified Example

[2-1] First Modified Example

The above one embodiment where a search unit 11b generates a search bit sequence having the same width as a bit width of a bit sequence held in an item name bit management table 12c, based on search conditions when narrowing down search target files 13a has been described. However, the present invention is not limited to this.

When, for example, a plurality of item names is included in search conditions, the search unit 11b according to the first modified example of one embodiment may generate a search bit sequence whose value of a bit position corresponding to an item of less numbers of files among a plurality of these items are valid and whose bit position is a final bit. In this case, the search unit 11b may perform AND of the generated search bit sequence and a bit sequence having the same width as a bit width of the search bit sequence among each bit sequence in the item name bit management table 12c. Consequently, it is possible to reduce a bit width whose AND is computed according to search conditions.

Figure 16:
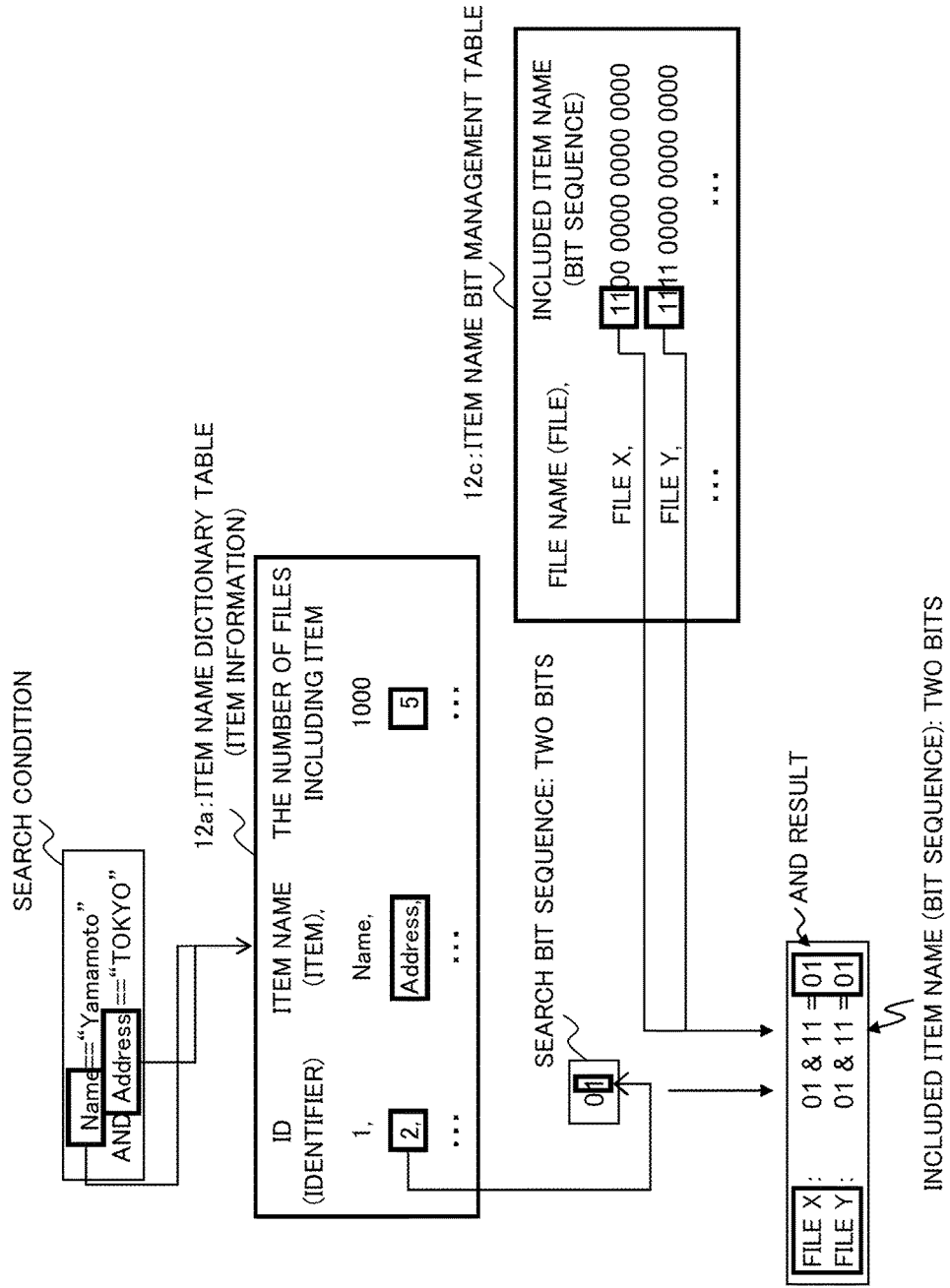
FIG. 16 illustrates a view for explaining a process of narrowing down files in a search unit according to a first modified example of one embodiment.
Figure 19:
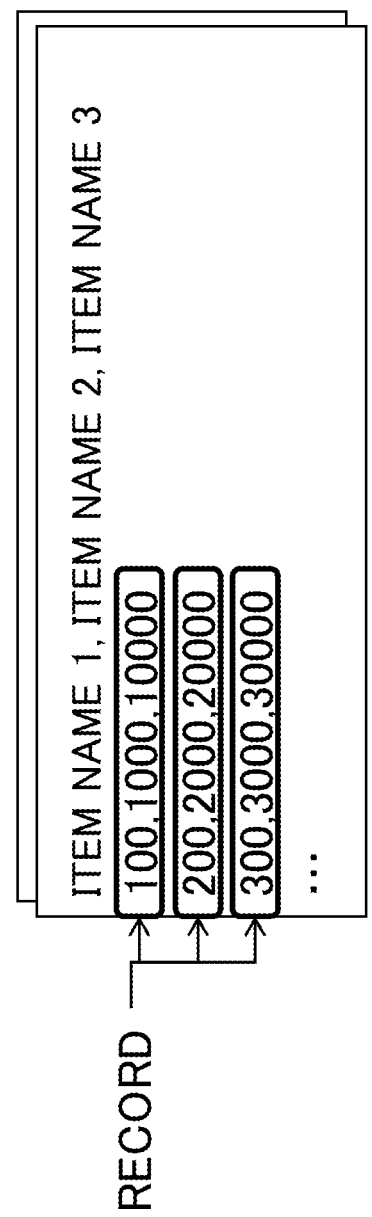
FIG. 19 illustrates a view illustrating an example of a flat file.
Figure 20:
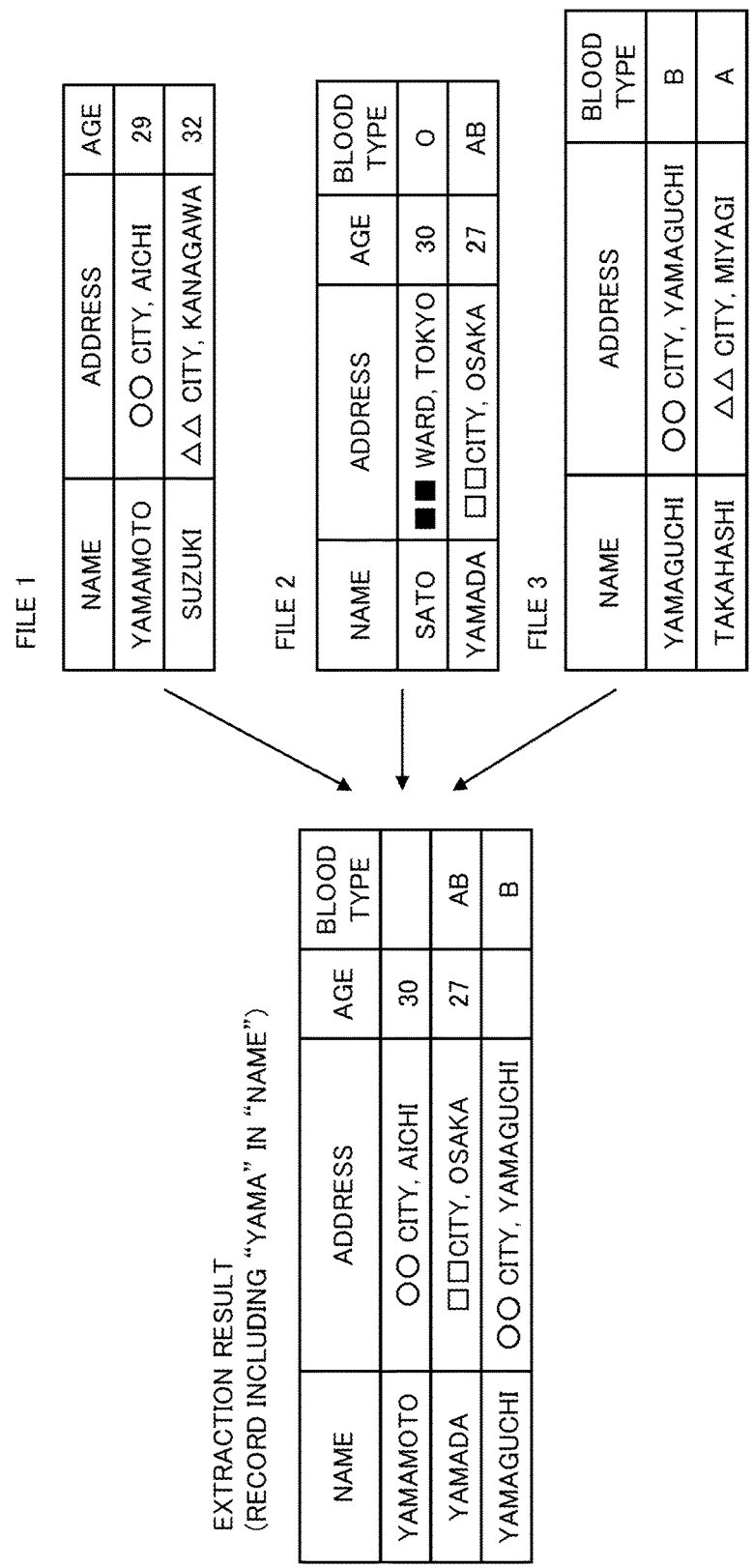
FIG. 20 illustrates a view illustrating an example of extraction of records from flat tiles.

FIG. 16 illustrates a view for explaining a process of narrowing down the files 13a by the search unit 11b according to the first modified example of one embodiment. A case where, as illustrated in, for example, FIG. 16, the numbers of files including item names {"Name", "Address"} included in search conditions are "1000" and "5" is assumed.

In this case, the search unit 11b specifies an ID "2" corresponding to the item name "Address" whose number of files is smaller, based on the item name dictionary table 12a. Next, the search unit 11b generates a search bit sequence "01" which is a search bit sequence whose value of a bit position (second bit) corresponding to the specified ID and has a bit width (second bit) from a head bit position to a bit position which is made valid as illustrated in FIG. 16.

Next, as illustrated in FIG. 16, the search unit 11b calculates AND (product) of the search bit sequence "01" and each bit sequence in the item name bit management table 12c which is each bit sequence "11" and "11" from a head bit position to a bit position which is made valid, i.e., the second bit.

Further, the search unit 11b specifies the files 13a corresponding to the bit sequence whose AND result matches the search bit sequence as search target files, and searches for the files 13a satisfying the search conditions, from the specified search target files 13a.

Thus, an information processing apparatus 1 according to the first modified example can provide the same effect as that of the above one embodiment and, in addition, the search unit 11b sets a priority to narrow down the search target files 13a and preferentially performs a process of narrowing down columns for which narrowing effects are high. Consequently, it is possible to reduce a bit width whose AND is computed according to search conditions, and improve search efficiency of a process of narrowing down the search target files 13a.

Alternatively, the search unit 11b generates a search bit sequence whose bit width is a maximum ID among IDs of item names included in the search conditions, and perform AND of the generated search bit sequence and a bit sequence having the same width as the bit width of the search bit sequence among each bit sequence in the item name bit management table 12c.

For example, upon receipt of a search request based on search conditions of "Name=="Yamamoto" AND Address=="TOKYO"" from the user or the like, the search unit 11b specifies IDs of the item names {"Name", "Address"} as "1" and "2" referring to the sorted item name dictionary table 12b. In this regard, the search unit 11b generates a search bit sequence of two bits whose first bit and second bit are valid, i.e., "1". Further, the search unit 11b performs AND of the generated search bit sequence of two bits and only bits of the first bit and the second bit of each bit sequence held in the item name bit management table 12c.

Consequently, it is possible to reduce a bit width whose AND is computed according to the search conditions and improve search efficiency of a process of narrowing down the search target files 13a.

[2-2] Second Modified Example

The above one embodiment and first modified example where a search unit 11b narrows down search target files 13a based on search conditions have been described. The present invention is not limited to this.

When, for example, the number of files including an item included in search conditions exceeds a predetermined threshold, the search unit 11b may stop a process of narrowing down the files 13a and search for the files 13a satisfying the search conditions from all files 13a. In this regard, the predetermined threshold is determined in advance based on read cost of an item name dictionary table 12a and read cost of the files 13a.

The read cost of the item name dictionary table 12a is, for example, the number of items included in the item name dictionary table 12a, i.e., the number of records. Further, the read cost of the files 13a is, for example, a size of the files 13a.

FIG. 17 illustrates a view illustrating an item name dictionary table 12a' according to the second modified example of one embodiment. FIG. 18 illustrates a view illustrating an item name bit management table 12c'. As illustrated in FIGS. 17 and 18, the item name dictionary table 12a' according to the second modified example further includes a total size of the files 13a including items per item, and the item name bit management table 12c' further includes a file size per file 13a. For example, the item name dictionary table 12a' holds records of "ID=1", "item name=Name", "the number of files including item=1000" and "total file size=200 MB" and records of "ID=2", "item name=Address", "the number of files including item=800" and "total file size=1 GB". Further, the item name bit management table 12c' holds a bit sequence and the record of a file size "10 MB" of a file X and a bit sequence and a record of a file size "1 MB" of a file Y. These total size and file size are used as information which influences the read cost of the files 13a to calculate a predetermined threshold by, for example, the search unit 11b.

When the search unit 11b specifies an ID included in search conditions upon a process of narrowing down the search target files 13a, if the number of records in the item name dictionary table 12a increases, a time to search for an item name increases and process performance lowers. Meanwhile, when a record satisfying search conditions is searched from all files 13a without narrowing down the files 13a, if the number of search target files is great or a file size is large, a time to open the search target files 13a increases and process performance lowers.

Hence, the search unit 11b according to the second modified example compares read cost of the item name dictionary table 12a for narrowing and read cost of the files 13a to read records, and calculates a predetermined threshold which is expected to improve search performance by narrowing down the search target files 13a. Further, when the number of files exceeds the predetermined threshold, the search unit 11b determines that an effect of a process of narrowing down the files 13a is little and sets all files 13a as search targets.

Thus, an information processing apparatus 1 according to the second modified example can provide the same effect as that of the above embodiment and, in addition, the search unit 11b can prevent an unnecessary narrowing process which requires read cost when an effect obtained by narrowing down the files 13a is little, so that it is possible to prevent process performance from lowering.

[3] Others

The preferred embodiment of the present invention has been described in detail. The present invention is not limited to specific embodiments, and can be variously deformed and changed in a range which does not deviate from the spirit of the present invention.

For example, the above embodiment and each modified example where files 13a are, for example, files of the CSV format and the XML format have been described. The present invention is not limited to this. For example, flat files of various formats such as a Delimiter-Separated Values (DSV) format such as Tab-Separated Values (TSV) or a format of a data description language such as HyperText Markup Language (HTML) may be used for the files 13a.

Further, a case where all search request target files 13a are files of the CSV format. However, even when search request targets are the files 13a of other formats such as the XML format, a file management unit 11 can perform the above-described process.

Furthermore, the search request target files 13a may be files 13a of a plurality of formats such as the CSV format and the XML format. In addition, modes of item names extracted by a storage unit 11a differ between the CSV format and the XML format. In, for example, FIGS. 6 and 7, an item name indicating a family name of a person is "Name" in case of the CSV format in FIG. 6 and is "/root/person/name" in case of the XML format in FIG. 7. Hence, when search request targets are the files 13a of a plurality of formats, a management region 12 may further store a conversion table in which item names are the same or substantially the same between the files 13a of different formats like the CSV format and the XML format. Consequently, a search unit 11b can convert an item name included in a search request into an adequate item name corresponding to the search target file 13a based on the conversion table, and realize cross-search between the files 13a of the different formats. In addition, a user may set the conversion table to the information processing apparatus 1, and set some patterns in advance.

Further, a case where, upon receipt of a storing request of the files 13a from the user or the like, the storage unit 11a updates each of tables 12a to 12c in the storage target file 13a has been described. However, the present invention is not limited to this. For example, the storage unit 11a resets each of the tables 12a to 12c (e.g. deletes all records or tables themselves) at a predetermined cycle or timing, extracts an item name from all files 13a stored in a file storage region 13 by the above-described process, and creates or updates each of the tables 12a to 12c. Consequently, even when the files 13a are repeatedly registered and deleted and an unmatch occurs between each of the tables 12a to 12c and the files 13a, each of the tables 12a to 12c is refreshed at a predetermined cycle or timing. Consequently, it is possible to prevent the unnecessary files 13a from being searched in a search process and prevent a search response from lowering.

Figure 21:
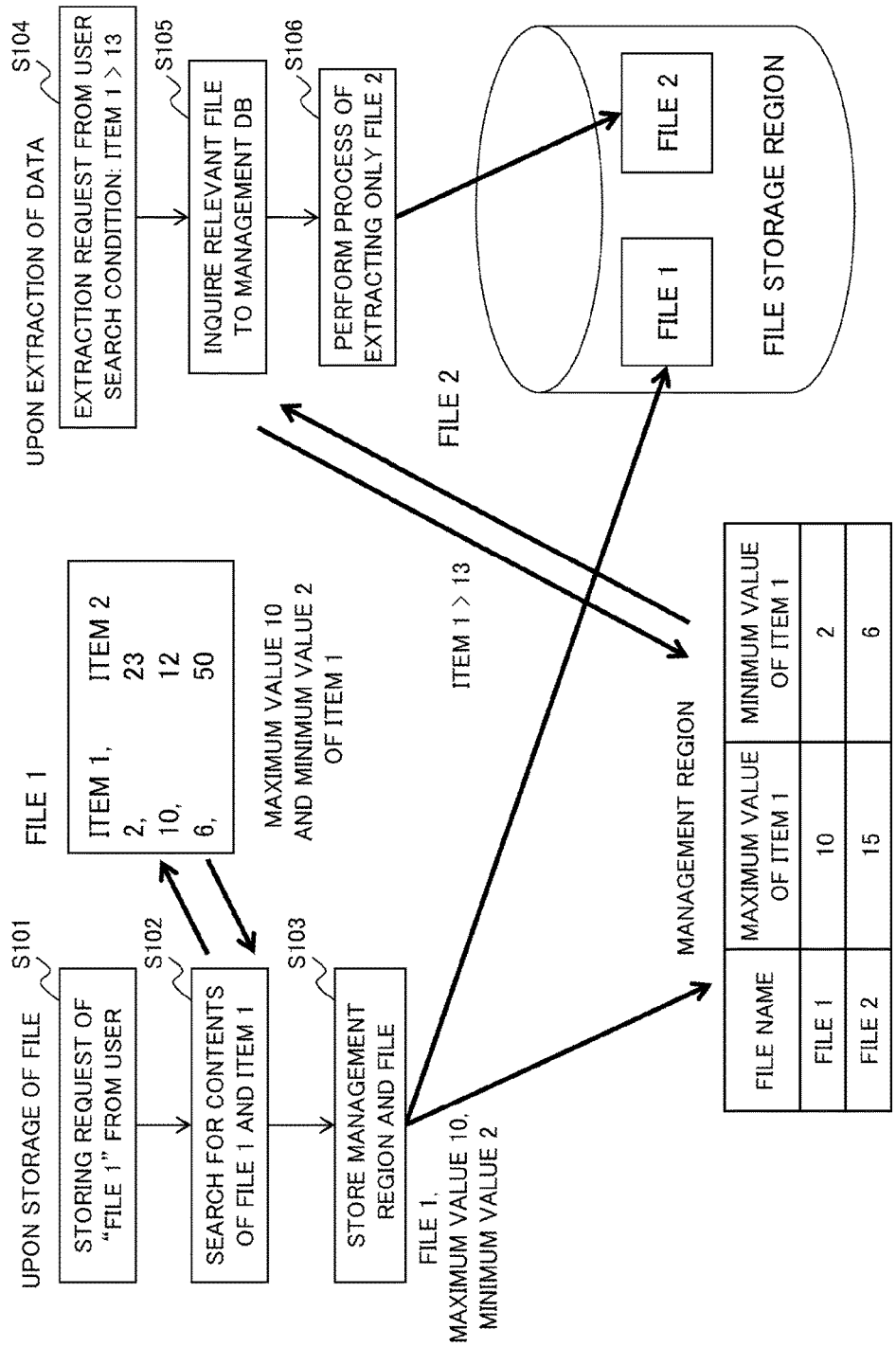
FIG. 21 illustrates a view for explaining an example of a process of narrowing down record extraction target flat files.

Further, the search unit 11b may narrow down the search target files 13a, then perform the process described with reference to FIG. 21 and further narrow down the search target files 13a. For example, upon storage of the file 13a, the storage unit 11a collects a maximum value and a minimum value whose item is highly likely to be included in search conditions requested by a user from all items, a predetermined item or a past record, and which are included in the file 13a to be stored. Further, the storage unit 11a associates the maximum value and the minimum value of each collected item with the file 13a to store in the management region 12 (see FIG. 21). Furthermore, the search unit 11b narrows down the search target files 13a based on a bit sequence, and then narrows down the files 13a having records in a range satisfying the search conditions, from information of the maximum value and the minimum value stored in the management region 12.

Consequently, the search unit 11b can narrow down the search target files 13a based on the bit sequence, then narrow down the files 13a having records satisfying the search conditions without opening the files 13a, and further improve search efficiency.

In addition, all or part of various functions of the above file management unit 11 (the storage unit 11a, the search unit 11b and a deleting unit 11c) are realized when a computer (including a CPU, an information processing apparatus and various terminals) executes a predetermined program.

The program is provided by being recorded in a (non-transitory) computer-readable recording medium such as a flexible disk, CDs (such as a CD-ROM, a CD-R or a CD-RW), DVDs (a DVD-ROM, a DVD-RAM, a DVD-R, a DVD-RW, a DVD+R or a DVD+RW) or a blu-ray disk. In this case, the computer uses the program by reading the program from this recording medium, and transferring and storing the program to and in an internal memory device or an external device.

In this regard, the computer means is a concept including hardware and an Operating System (OS) and means hardware which operates under control of the OS. Further, when the OS is not required and the hardware is operated by an application program alone, the hardware corresponds to the computer. The hardware has at least a microprocessor such as a CPU and means for reading a computer program recorded in a recording medium. The program includes a program code which causes the above computer to realize the various functions of an information processing apparatus 1 according to the present embodiment. Further, part of the functions may be realized by the OS not by the application program.

In addition, the present invention is not limited to the above object. Another object of the present invention is to provide a function and an operation which are provided by each configuration described in the above best mode for carrying out the invention and which is not be provided by a conventional technique.

According to the embodiment, it is possible to improve search efficiency when information is searched among a plurality of files.

All examples and conditional language recited provided herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing apparatus comprising:
   a memory configured to store item information and file information, the item information indicating, for each of a plurality of items included in data of a plurality of files, the number of files among the plurality of files including the item and an identifier per item, and the file information indicating whether each of the plurality of files includes each of the plurality of items and includes a bit sequence indicating whether or not each of the files includes an item corresponding to the identifier according to whether a value of a bit position corresponding to the identifier is valid or invalid; and
a processor coupled to the memory and the processor configured to:
upon receipt of a deletion request of a file, update the number of files of items included in the data of the file of a deletion target in the item information stored in the memory and utilized in searching, and, when the number of files becomes 0, delete an item whose number of files becomes 0 and the number of files including the item from the item information stored in the memory and utilized in the searching,
specify, subsequent to the updating of the number of files based upon the deletion request, an identifier of an item included in a search condition based on the item information,
extract search target files whose values of bit positions corresponding to the specified identifier are valid, based on the file information and subsequent to the updating of the number of files based upon the deletion request,
generate a search bit sequence whose value of the bit position corresponds to the specified identifier, and
search for the file satisfying the search condition, from the search target files corresponding to a bit sequence whose product of the search bit sequence and each bit sequence of the file information match the search bit sequence.

2. The information processing apparatus according to claim 1, wherein the processor specifies a bit position whose value is valid in a bit sequence corresponding to the file to be deleted in the file information, deletes the bit sequence and subtracts the number of files of an item corresponding to the specified bit position in the item information.

3. The information processing apparatus according to claim 2, wherein, when there is a bit position whose value is invalid in all bit sequences in the file information, the processor deletes a bit at the invalid bit position from the all bit sequences, and shifts one or more bits lower than the invalid bit position towards an upper side by the number of deleted bits.

4. The information processing apparatus according to claim 1, wherein the processor
when the search condition includes a plurality of items, specifies based on the item information an identifier of an item corresponding to a smaller number of files among the plurality of items included in the search condition,
generates the search bit sequence whose value of the bit position corresponding to the specified identifier is made valid and which includes a bit width from a head bit position to the bit position which is made valid, and
searches for the file satisfying the search condition from the search target files corresponding to a bit sequence whose product of the search bit sequence and each bit sequence of the file information from the head bit position to the bit position which is made valid matches the search bit sequence.

5. The information processing apparatus according to claim 1, wherein, when the number of files corresponding to the identifier specified based on the item information exceeds a predetermined threshold, the processor stops extracting the search target files whose values of the bit positions corresponding to the specified identifier are valid, and searches for the file satisfying the search condition from all files.

6. The information processing apparatus according to claim 5, wherein
the item information further includes a total size of files including the items per item, and
the processor calculates the predetermined threshold based on the total size per item.

7. The information processing apparatus according to claim 1, wherein the processor
specifies an identifier of an item included in the search condition based on sorted item information including the items which are the plurality of items included in the item information and are sorted in predetermined order and identifiers corresponding to the items, and
when the number of files of the item included in the file of the deletion target becomes 0, further deletes the item whose number of files becomes 0 and the identifier corresponding to the item from the sorted item information.

8. A file management method comprising:
searching for a file satisfying a requested search condition based on item information and file information stored in a memory, the item information indicating, for each of a plurality of items included in data of a plurality of files, the number of files among the plurality of files including the item and an identifier per item, and the file information indicating whether each of the plurality of files includes each of the plurality of items and includes a bit sequence indicating whether or not each of the files includes an item corresponding to the identifier according to whether a value of a bit position corresponding to the identifier is valid or invalid;
upon receipt of a deletion request of a file, updating the number of files of items included in the data of the file of a deletion target in the item information stored in the memory and utilized in the searching, and, when the number of files becomes 0, deleting an item whose number of files becomes 0 and the number of files including the item from the item information stored in the memory and utilized in the searching;
specifying, subsequent to the updating of the number of files based upon the deletion request, an identifier of an item included in a search condition based on the item information;
extracting search target files whose values of bit positions corresponding to the specified identifier are valid, based on the file information and subsequent to the updating of the number of files based upon the deletion request;
generating a search bit sequence whose value of the bit position corresponds to the specified identifier; and
searching for the file satisfying the search condition, from the search target files corresponding to a bit sequence whose product of the search bit sequence and each bit sequence of the file information match the search bit sequence.

9. The file management method according to claim 8, further comprising:
in the deleting, specifying a bit position whose value is valid in a bit sequence corresponding to the file to be deleted in the file information and deleting the bit sequence; and
subtracting the number of files of an item corresponding to the specified bit position in the item information in processing of updating the number of files of the item included in the file of the deletion target in the item information.

10. The file management method according to claim 9, further comprising: in the deleting, when there is a bit position whose value is invalid in the all bit sequences in the file information, deleting a bit at the invalid bit position from all bit sequences, and shifting one or more bits lower than the invalid bit position towards an upper side by the number of deleted bits.

11. A non-transitory computer-readable recording medium having stored therein a file management program for causing a computer to execute a process comprising:

searching for a file satisfying a requested search condition based on item information and file information stored in a memory, the item information indicating, for each of a plurality of items included in data of a plurality of files, the number of files among the plurality of files including the item, and the file information indicating whether each of the plurality of files includes each of the plurality of items and includes a bit sequence indicating whether or not each of the files includes an item corresponding to the identifier according to whether a value of a bit position corresponding to the identifier is valid or invalid;

upon receipt of a deletion request of a file, updating the number of files of items included in the data of the file of a deletion target in the item information stored in the memory and utilized in the searching, and, when the number of files becomes 0, deleting an item whose number of files becomes 0 and the number of files including the item from the item information stored in the memory and utilized in the searching;

specifying, subsequent to the updating of the number of files based upon the deletion request, an identifier of an item included in a search condition based on the item information;

extracting search target files whose values of bit positions corresponding to the specified identifier are valid, based on the file information and subsequent to the updating of the number of files based upon the deletion request;

generating a search bit sequence whose value of the bit position corresponds to the specified identifier; and searching for the file satisfying the search condition, from the search target files corresponding to a bit sequence whose product of the search bit sequence and each bit sequence of the file information match the search bit sequence.

12. The non-transitory computer-readable recording medium according to claim 8, the process further comprising:

in the deleting, specifying a bit position whose value is valid in a bit sequence corresponding to the file to be deleted in the file information and deleting the bit sequence; and subtracting the number of files of an item corresponding to the specified bit position in the item information in processing of updating the number of files of the item included in the file of the deletion target in the item information.

13. The non-transitory computer-readable recording medium according to claim 12, the process further comprising: in the deleting, when there is a bit position whose value is invalid in the all bit sequences in the file information, deleting a bit at the invalid bit position from all bit sequences, and shifting one or more bits lower than the invalid bit position towards an upper side by the number of deleted bits.

* * * * *